United States Patent
Khotimsky et al.

(10) Patent No.: US 9,749,078 B2
(45) Date of Patent: Aug. 29, 2017

(54) 10 GIGABIT PER SECOND CAPABLE PASSIVE OPTICAL NETWORK SYSTEM WITH FLEXIBLE NOMINAL UPSTREAM BITRATE

(71) Applicants: ZTE CORPORATION, Shenzhen, Guangdong (CN); ZTE (USA) INC., Richardson, TX (US)

(72) Inventors: Denis Andreyevich Khotimsky, Westborough, MA (US); Liquan Yuan, Shanghai (CN); Dezhi Zhang, Shanghai (CN)

(73) Assignees: ZTE Corporation (CN); ZTE (USA), Inc., Richardson, TX (US)

( * ) Notice: Subject to any disclaimer, the term of this patent is extended or adjusted under 35 U.S.C. 154(b) by 186 days.

(21) Appl. No.: 14/438,830

(22) PCT Filed: Oct. 25, 2013

(86) PCT No.: PCT/CN2013/086004
§ 371 (c)(1),
(2) Date: Apr. 27, 2015

(87) PCT Pub. No.: WO2014/063656
PCT Pub. Date: May 1, 2014

(65) Prior Publication Data
US 2015/0288480 A1    Oct. 8, 2015

Related U.S. Application Data

(63) Continuation-in-part of application No. PCT/CN2012/083632, filed on Oct. 27, 2012.

(51) Int. Cl.
*H04J 14/00* (2006.01)
*H04J 14/02* (2006.01)
(Continued)

(52) U.S. Cl.
CPC .......... *H04J 14/0238* (2013.01); *H04B 10/27* (2013.01); *H04Q 11/0067* (2013.01);
(Continued)

(58) Field of Classification Search
CPC H04B 10/27; H04B 10/2503; H04B 10/2575; H04J 14/02; H04J 14/0238; H04J 14/0221
(Continued)

(56) References Cited

U.S. PATENT DOCUMENTS 9,184,847 B2 * 11/2015 Luo .................... H04L 12/2861
2009/0202026 A1   8/2009 Huang
(Continued)

FOREIGN PATENT DOCUMENTS

| CN | 101330450 A | 12/2008 |
| CN | 101467395 A | 6/2009 |

(Continued)

OTHER PUBLICATIONS

PCT International Search Report Dated Jan. 23, 2014, Application No. PCT/CN2013/086004, Applicant ZTE Corporation et al., 4 Pages.
(Continued)

*Primary Examiner* — Hanh Phan
(74) *Attorney, Agent, or Firm* — Brooks Kushman P.C.

(57) ABSTRACT

Techniques, apparatus and systems are described for accommodating the optical network units (ONUs) having different nominal upstream bitrates on the same passive optical network (PON) system by making the specified burst preamble and the bandwidth map allocation record format invariant with respect to the nominal upstream bitrate of a target ONU. The disclosed techniques, apparatus and systems allow seamless evolution of the lower-bitrate services to higher-bitrate services offered to an end-user without need (Continued)

to upgrade the central office equipment. In addition they can avoid the adverse consequences of inadvertently connecting a high-upstream-bitrate ONU to a lower-upstream-bitrate network.

12 Claims, 9 Drawing Sheets

(51) Int. Cl.
*H04Q 11/00* (2006.01)
*H04B 10/27* (2013.01)

(52) U.S. Cl.
CPC ............. *H04Q 2011/0064* (2013.01); *H04Q 2213/1301* (2013.01)

(58) Field of Classification Search
USPC ........ 398/66, 67, 68, 69, 70, 71, 72, 79, 58, 398/98, 99, 100, 154, 155, 158, 159, 25; 370/352, 392, 389, 468, 395.51, 503
See application file for complete search history.

(56) References Cited

U.S. PATENT DOCUMENTS

| | | | |
|---|---|---|---|
| 2009/0297162 A1 | 12/2009 | Kai et al. | |
| 2009/0304385 A1* | 12/2009 | Khermosh | H04J 14/0282 398/58 |
| 2012/0008948 A1* | 1/2012 | Kazawa | H04L 12/44 398/58 |
| 2012/0106958 A1* | 5/2012 | Sakamoto | H04J 14/0282 398/58 |

FOREIGN PATENT DOCUMENTS

| | | |
|---|---|---|
| CN | 101621452 A | 1/2010 |
| DE | 102006025918 | 12/2007 |
| EP | 2058961 | 5/2009 |
| WO | 2011145218 A1 | 11/2011 |

OTHER PUBLICATIONS

Extended European Search Report for European Application No. 13848761.6, Completed by the European Patent Office, Dated Oct. 16, 2015, 9 Pages.

* cited by examiner

10 GIGABIT PER SECOND CAPABLE PASSIVE OPTICAL NETWORK SYSTEM WITH FLEXIBLE NOMINAL UPSTREAM BITRATE

CROSS-REFERENCE TO RELATED APPLICATIONS

This application is a U.S. national phase of PCT Application No. PCT/CN2013/086004 filed Oct. 25, 2013, which claims priority to PCT Application No. PCT/CN2012/083632 filed Oct. 27, 2012, the disclosures of which are incorporated in their entirety by reference herein.

TECHNICAL FIELD

The disclosed embodiments relate to systems, devices, and techniques for implementing data communications in a passive optical network, and in particular to a 10 Gigabit per second capable passive optical network system with flexible nominal upstream bitrate.

BACKGROUND

A passive optical network (PON) is an optical network architecture based on point-to-multipoint (P2MP) topology in which a single optical fiber and multiple passive branching points are used to provide data communication services. A PON system can facilitate user access to telecommunication, information, entertainment, and other resources of the Internet with a service provider's communication facility. A PON system typically includes a central node, called an "optical line terminal" (OLT), which can be in connection with a single or multiple user nodes called "optical network units" (ONUs) via a passive optical distribution network (ODN). An OLT is usually located at the service provider's communication facility (central office). An ONU can be located at or near an access user's premises.

SUMMARY

Techniques, apparatus and systems are described below for accommodating the optical network units (ONUs) of different nominal upstream bitrates on the same flexible passive optical network (PON) system by making the burst preamble specification and the bandwidth map allocation format invariant to the nominal upstream bitrate of a target ONU. The disclosed techniques, apparatus, and systems can also avoid the adverse consequences of inadvertently connecting a high-upstream-bitrate ONU to a lower-upstream-bitrate network.

In accordance with some implementations described below, a method of accommodating optical network units (ONUs) of different nominal upstream bitrates in a 10-gigabit per second capable passive optical network (PON) system comprises: providing a unified burst preamble specification and a unified format bandwidth map allocations in a downstream direction; and adjusting burst preambles for the ONUs according to the respective ONU nominal upstream bitrates.

In some implementations, the burst preamble of an ONU having a nominal upstream bitrate of S times a base upstream bitrate is formed by repeating a specified unified burst preamble.

In some implementations, the burst preamble of an ONU having a nominal upstream bitrate of S times a base upstream bitrate is formed by substituting every 0 and every 1 in a specified unified burst preamble with a predefined S-bit zero-pattern and a predefined S-bit one-pattern, respectively.

In some implementations, a delimiter bit-pattern remains invariant with respect to the nominal upstream bitrate of the ONU.

In accordance with some implementations described below, a method of accommodating optical network units (ONUs) having different nominal upstream bitrates in a 10-gigabit per second capable passive optical network (PON) system comprises: interpreting bandwidth map allocations for the individual ONUs according to the ONUs' respective nominal upstream bitrates; and determining a nominal upstream bitrate for each individual ONU by analyzing its associated burst preambles.

In some implementations, a StartTime parameter of a bandwidth map allocation record points to a fixed set of reference instants within an upstream burst, the fixed set being invariant with respect to a nominal upstream bitrate of a target ONU.

In some implementations, a GrantSize parameter of a bandwidth map allocation record determines a size of a upstream burst in term of fixed size words, said word size being invariant with respect to a nominal upstream bitrate of a target ONU.

In some implementations, two unused bits of the GrantSize parameter are used as an offset to improve a granularity of an effective StartTime parameter value.

In accordance with some implementations described below, an optical network unit (ONU) is configured to: receive a unified burst preamble specification and a unified format bandwidth map allocations in a downstream direction; and adjust a burst preamble of the ONU according to a nominal upstream bitrate of the ONU.

In some implementations, the burst preamble of the ONU having a nominal upstream bitrate of S times a base upstream bitrate is formed by repeating a specified unified burst preamble.

In some implementations, the burst preamble of the ONU having a nominal upstream bitrate of S times a base upstream bitrate is formed by substituting every 0 and every 1 in a specified unified burst preamble with a predefined S-bit zero-pattern and a predefined S bit one-pattern, respectively.

In some implementations, a delimiter bit-pattern remains invariant with respect to the nominal upstream bitrate of the ONU.

BRIEF DESCRIPTION OF DRAWINGS

The aforementioned implementation of the patent document as well as additional implementations will be more clearly understood as a result of the following detailed description of the various aspects of the patent document when taken in conjunction with the drawings. Like reference numerals refer to corresponding parts throughout the several views of the drawings.

DETAILED DESCRIPTION

Figure 1:
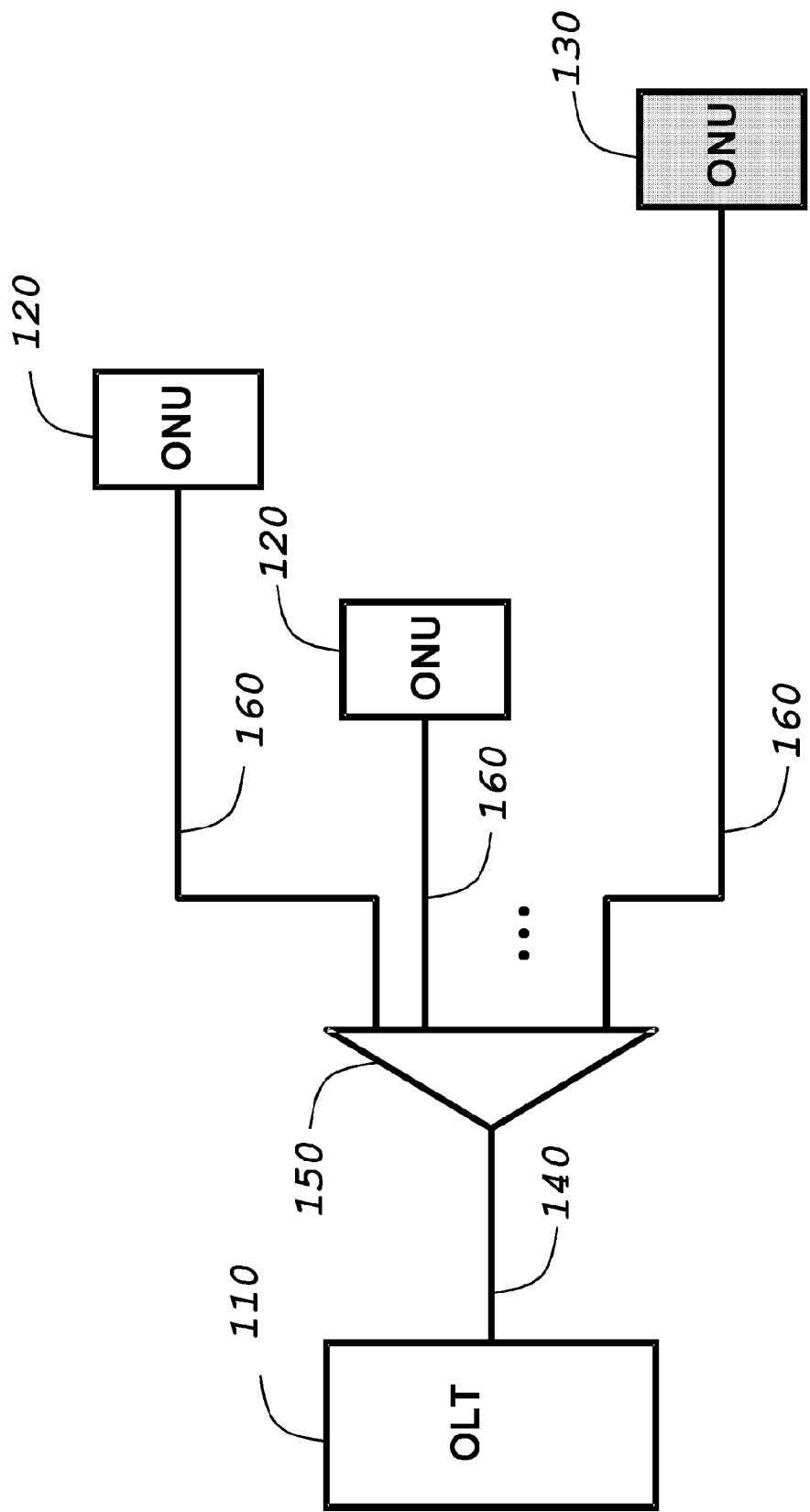
FIG. 1 depicts an exemplary PON system in accordance with some implementations of the present application.

FIG. 1 depicts an exemplary PON system including an OLT 110, multiple ONUs 120 and 130, of which ONUs 120 and ONU 130 have different nominal upstream bitrates and an ODN that includes optical feeder fiber or trunk fiber 140, splitter 150, and multiple distribution fibers 160 in accordance with some implementations of the present application. The PON system accommodates the multiple ONUs on the same point-to-multipoint optical distribution network (ODN). The ODN includes a P2MP optical fiber infrastructure where passive branching points can be represented by optical splitters or other similar passive optical devices. The passive ODN equipment can be deployed within street cabinets, closets, underground utility holes, cable chambers, and other installations and require no electrical power and little maintenance.

In some implementations, all ONUs communicating to the same OLT on a given ODN operate at the same nominal upstream bitrate. To ensure the absence of collisions between upstream transmissions of different ONUs, a media access protocol is employed. According to a standard-based time-division multiplexing (TDM)/time-division multiple access (TDMA) PON system, such as XG-PON1 defined in the ITU-T Recommendation series G.987/G.988, where the nominal downstream bitrate is 9.95328 Gbit/s (10 G, for short) and the nominal upstream bitrate is 2.48832 Gbit/s (2.5 G, for short), a predefined period of time is synchronously divided into 125 microsecond physical layer (PHY) frames, and the multiple access to the upstream link is achieved by generating and broadcasting a bandwidth map (BWmap) for each upstream PHY frame.

Figure 4:
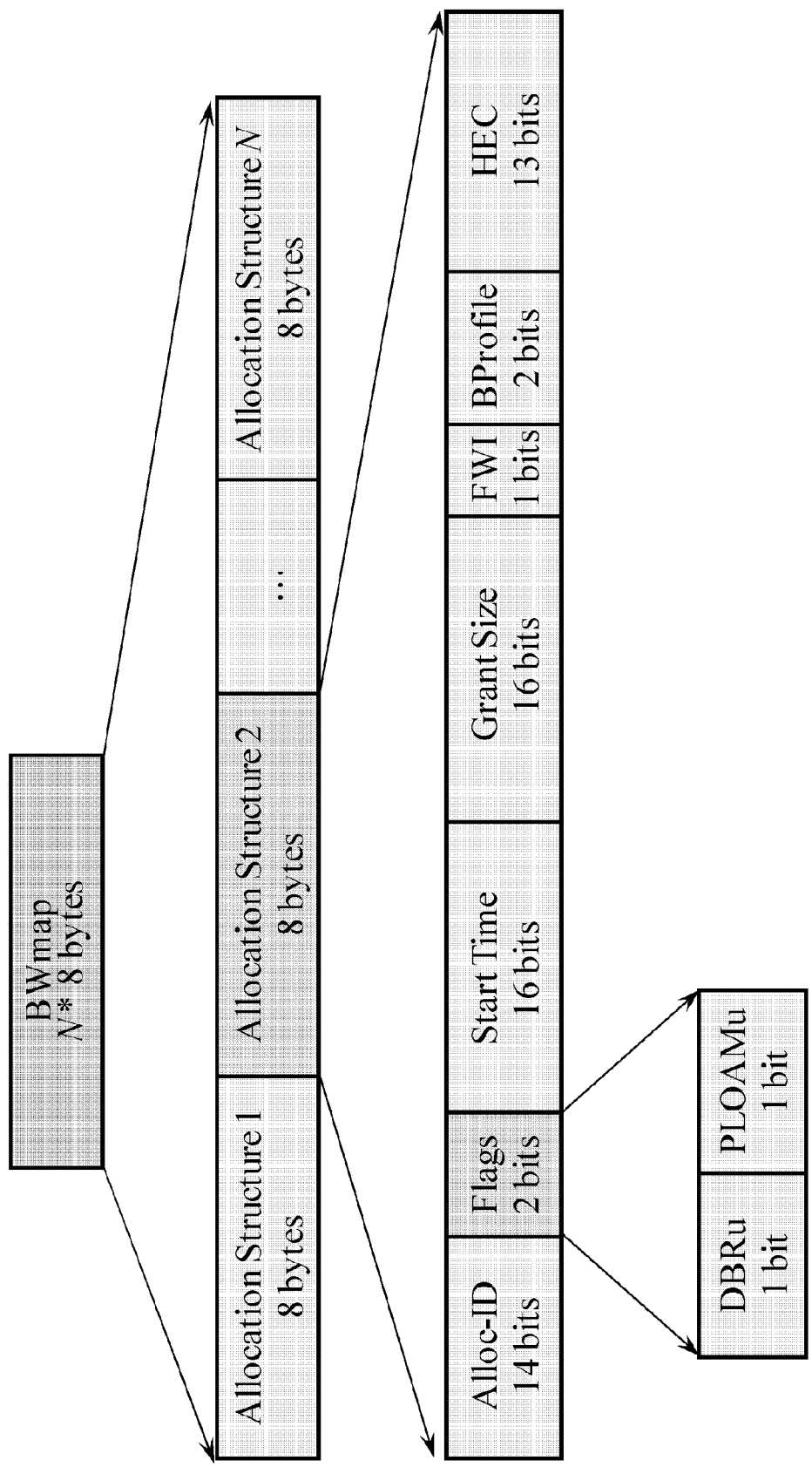
FIG. 4 illustrates a standard-based format of a bandwidth map (BWmap) in accordance with some implementations of the present application.

FIG. 4 illustrates a standard-based format of a bandwidth map (BWmap) in accordance with some implementations of the present application. As shown in FIG. 4, a bandwidth map is a data structure containing a plurality of allocation records. While the size of the bandwidth map is established and communicated dynamically, each allocation record has a fixed length and contains at least three fields:

the identifier of a recipient of the upstream transmission grant (known as the "Alloc-ID" parameter);

the specification of time when the granted upstream transmission should start (known as the "StartTime" parameter); and the size of the payload that the recipient of the transmission grant is allowed to transmit (known as the "GrantSize" parameter).

Figure 5:
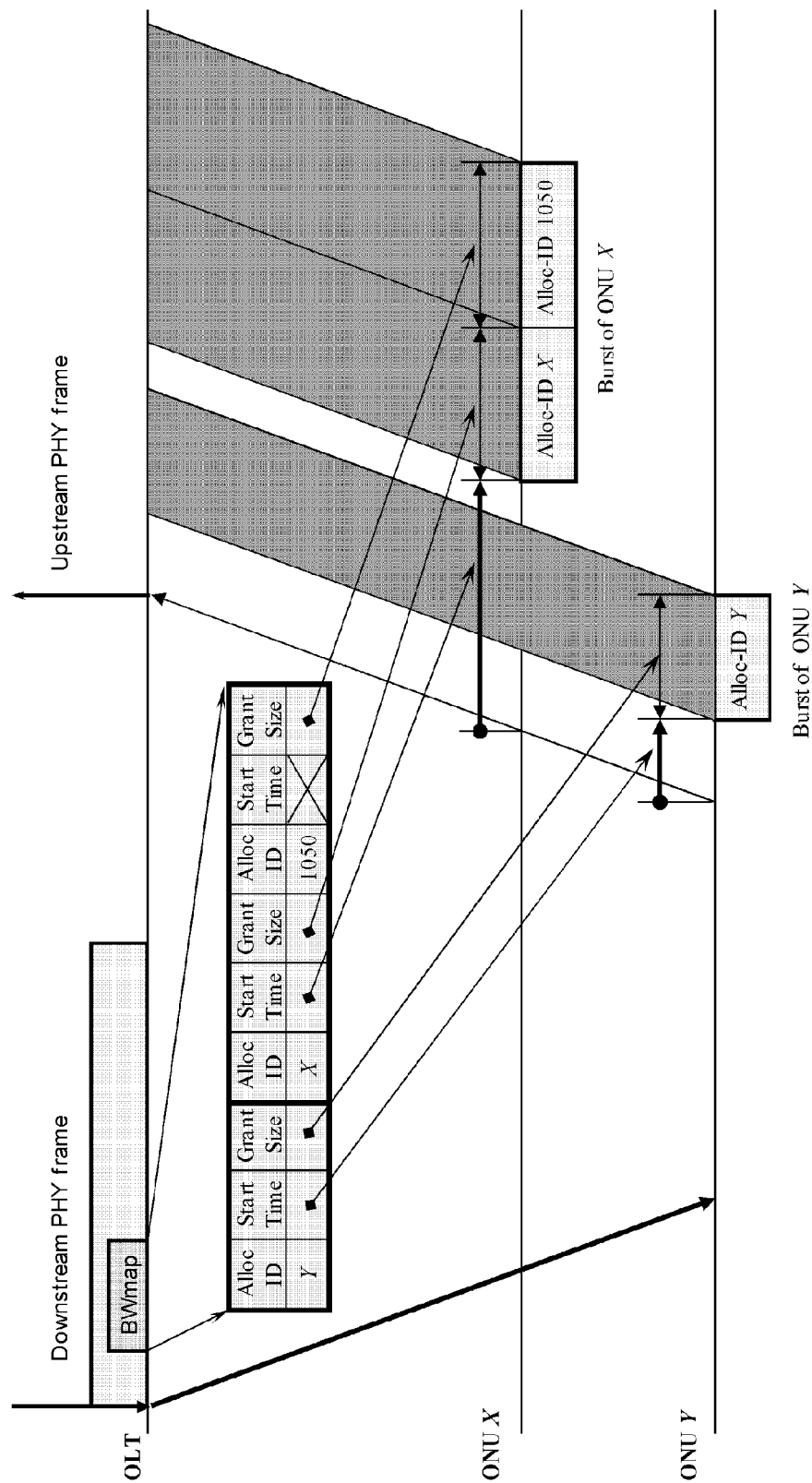
FIG. 5 illustrates a standard-based multiple access control with the StartTime and GrantSize parameters in accordance with some implementations of the present application.

FIG. 5 illustrates a standard-based multiple access control with the StartTime and GrantSize parameters in accordance with some implementations of the present application. In XG-PON1, the 125 microsecond upstream PHY frame can accommodate 38880 bytes. The StartTime parameter is a 16-bit integer field that has values from 0 to 9719 and refers to the reference points corresponding to the 4-byte word boundaries within an upstream PHY frame. If one and the same ONU is granted multiple contiguous transmissions opportunities, only the first allocation record contains the non-default StartTime parameter. In that case all the subsequent transmissions are assumed to commence immediately upon the conclusion of the preceding transmission. The non-default GrantSize parameter is present in an allocation record and it defines the granted payload size of the specific upstream transmission as the number of 4-byte words. The GrantSize parameter is a 16-bit integer field that can take values 0, 1, and 4 . . . 9718.

Figure 2:
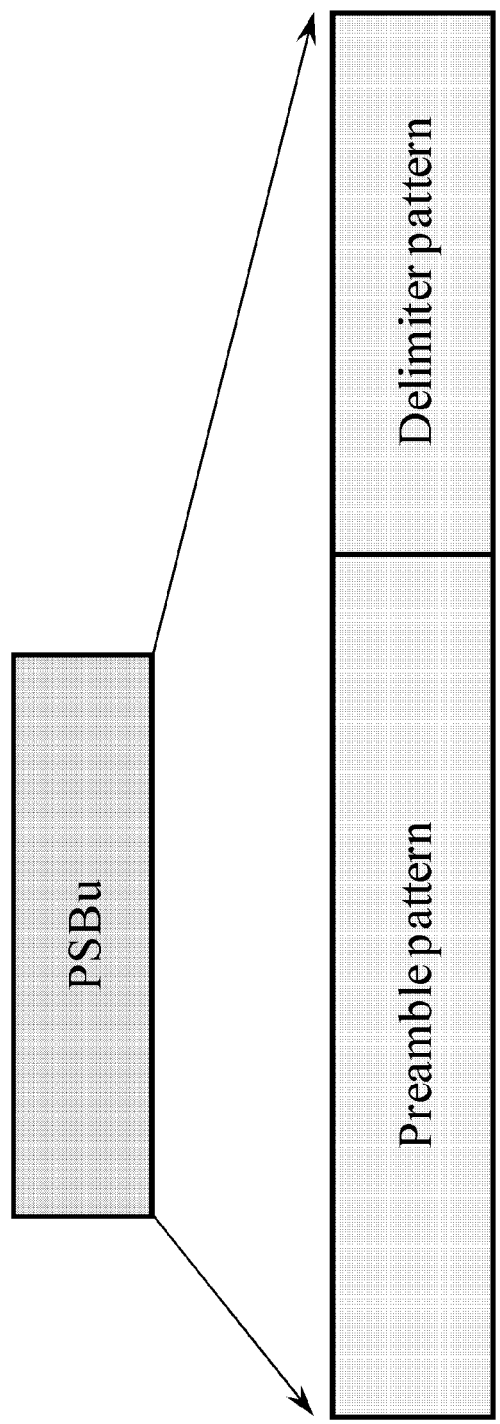
FIG. 2 depicts a standard-based format of upstream physical synchronization block (PSBu) in accordance with some implementations of the present application.

A sequence of contiguous upstream transmissions opportunities for one and the same ONU is referred to as a "burst". Since different ONUs within a PON system may transmit at substantially varying optical power levels, but slightly different frequencies and different phases, each burst must be preceded by a special binary sequence known as the "upstream Physical Synchronization Block" (PSBu) to allow the OLT receiver to adjust the power level, recover clock and phase of the signal, and to delineate the burst properly. As shown in FIG. 2, a PSBu is composed of a preamble and a delimiter. The preamble and delimiter are specified in the run time for a set of burst profiles in a broadcast communication to all the ONUs on the PON. The preamble in a G.987 XG-PON1 system is specified in terms of length, pattern, and repeat count; the delimiter is specified is terms of length and pattern. The transmission of a burst's preamble and delimiter precedes the value of the StartTime parameter specified in the BWmap allocation record.

In some implementations of a PON system, the nominal upstream bitrate of an ONU can be increased, for example, to 9.95328 Gbit/s (or 10 G) because both the burst profile specification mechanism and the BWmap format of the G.987 XG-PON1 system standard have been designed to scale to 10 G nominal upstream bitrate. In this case, if all the ONUs on the PON continue to operate at the same, albeit higher, nominal upstream bitrate, the preamble and delimiter specification mechanism and the BWmap format are still adequate whereas the ranges of the StartTime and GrantSize parameters within the allocation records may need to be adjusted.

Figure 6:
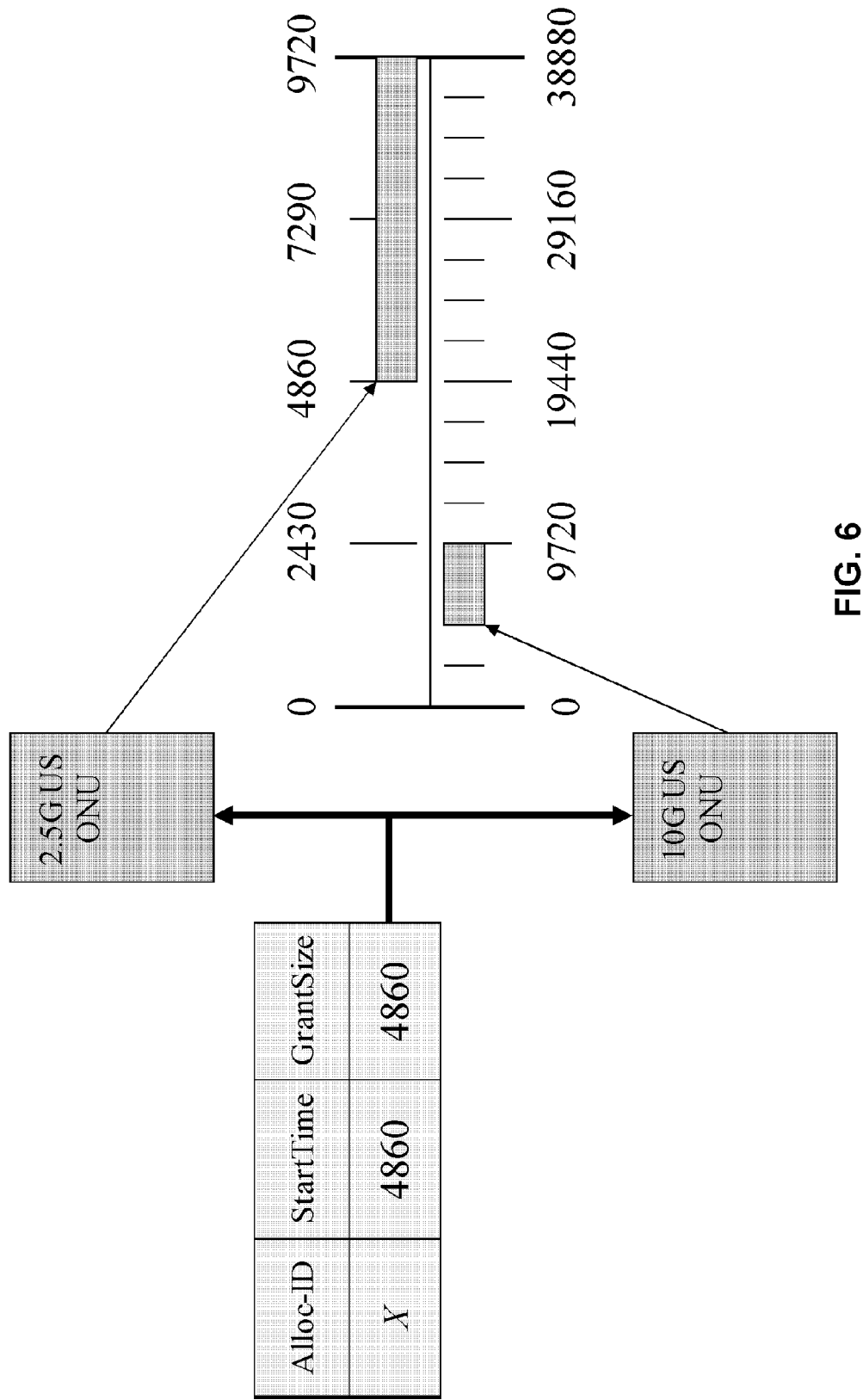
FIG. 6 illustrates the mechanism of potential collision under the prior art extension of the standard-based multiple access control.

As shown in FIG. 4, the current 10 G extension of the G.987 XG-PON1 BWmap format calls for a 16-bit Start-Time parameter to take values from 0 to 38879 and refer to the reference points within the 125 microsecond frame corresponding to the 4-byte word boundaries. The GrantSize parameter in the current 10 G extension takes values up to 38878 and defines the granted payload size of the specific upstream transmission as the number of 4-byte words. Note that these extensions imply that one and the same non-zero numeric value of StartTime parameter should define different reference points within an upstream PHY frame from the perspectives of the 2.5 G upstream ONU and the 10 G upstream ONU. But as long as the ONUs of different nominal upstream bitrates are not mixed on the same PON, the difference in interpretation does not cause a conflict. Nonetheless, if one and the same PON does have ONUs that operate at different nominal upstream bitrates and interpret the same value of the StartTime parameter differently, a traffic collision may occur. FIG. 6 illustrates the mechanism of potential collision under the prior art extension of the standard-based multiple access control. The presence of the ONUs operating at different nominal upstream bitrates on the same PON may be either deliberate or accidental if a high-upstream-bitrate ONU is attached to a lower-bitrate network as a result of an inadvertent mistake by a technician or an unscrupulous user. In that case, the attached high-upstream-bitrate ONU would effectively behave like a rogue device creating interference to the legitimate ONUs on the same PON.

Figure 7:
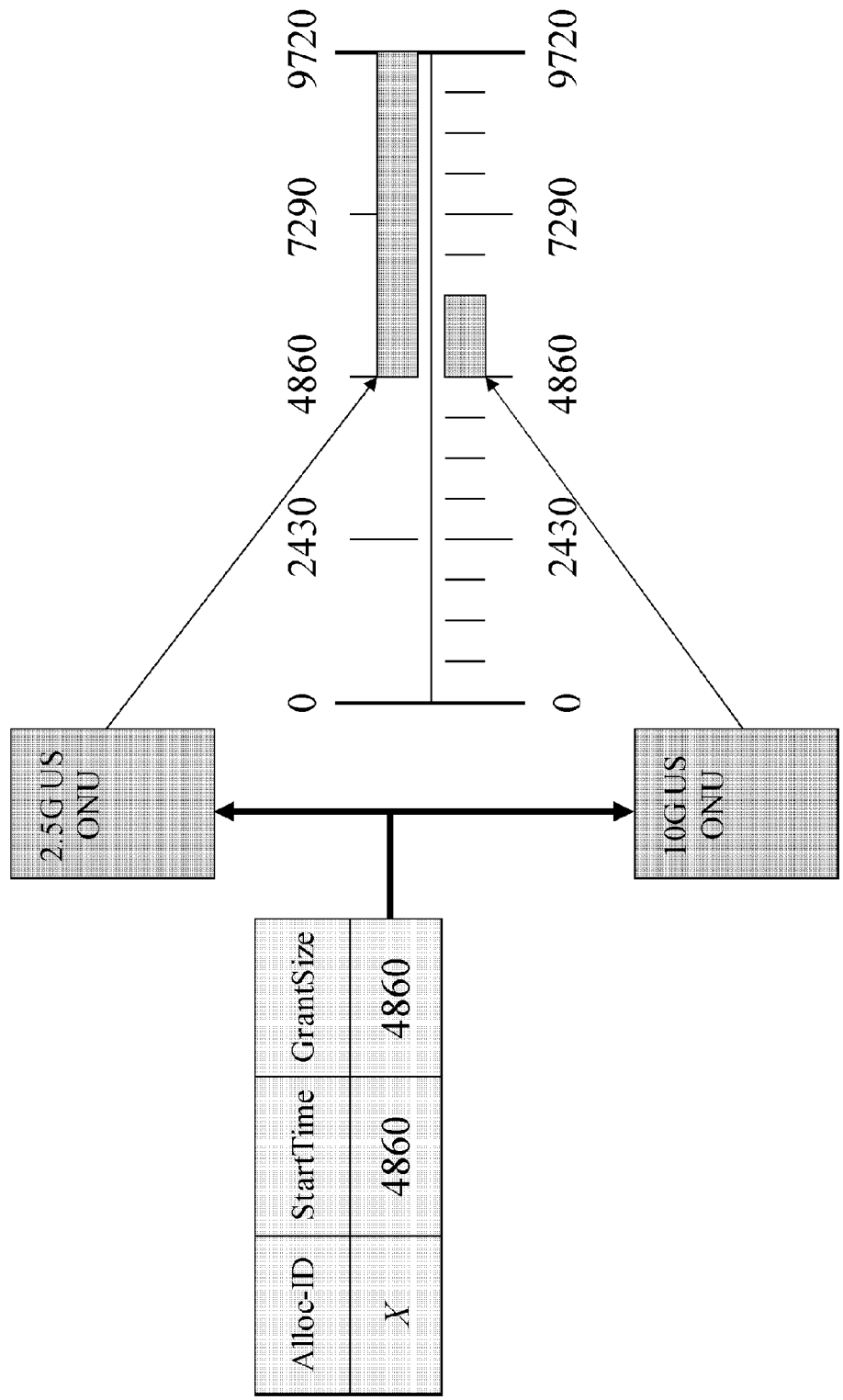
FIG. 7 illustrates the avoidance of collision under the disclosed invariant bandwidth map format extension in accordance with some implementations of the present application.
Figure 8:
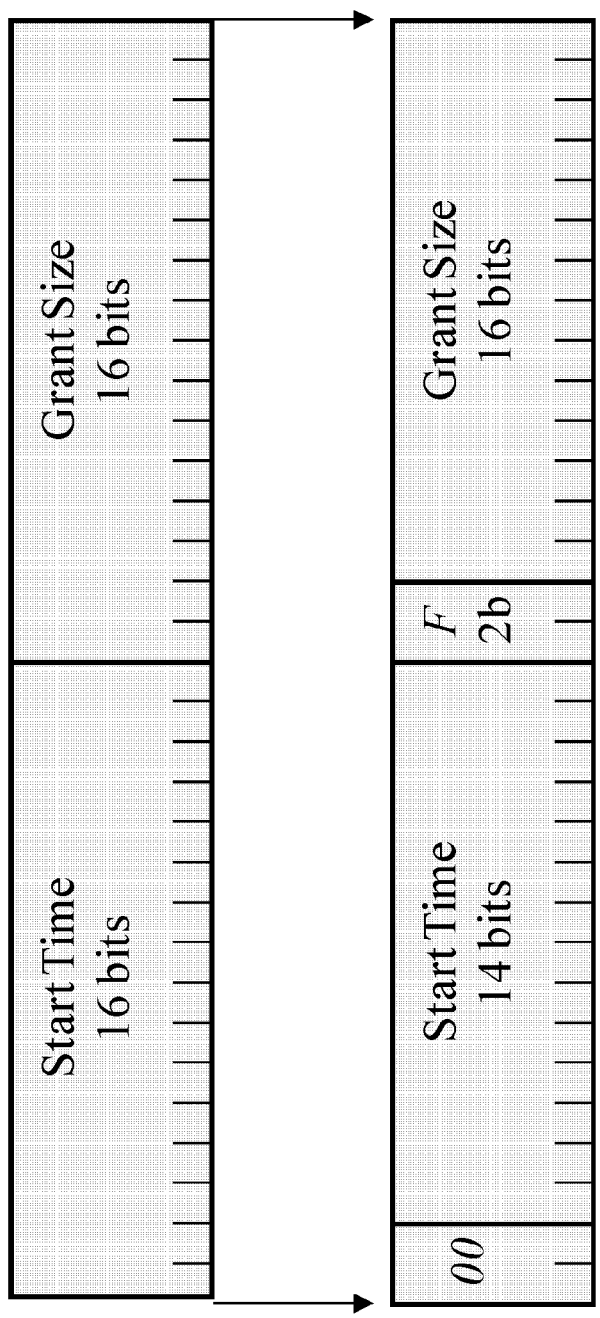
FIG. 8 illustrates one way of invariantly remapping the fields of the Bandwidth map for interpretation by the high-upstream-bitrate ONUs only in accordance with some implementations of the present application.

FIG. 7 illustrates the avoidance of collision under the disclosed invariant bandwidth map format extension in accordance with some implementations of the present application. For the purpose of seamless migration of information, communication, and entertainment services to higher data rates, it is desired to support ONUs of various nominal upstream bitrates on the same PON system in a flexible way. The present application discloses techniques, apparatus and systems to support such flexible system while maintaining the invariant burst profile specification mechanism and BWmap format.

It is assumed that all ONUs of a flexible bitrate PON system, except for the base bitrate ONUs, know their respective nominal upstream bitrates, which can be expressed in terms of a speedup factor S with respect to the base upstream bitrate. For example, if the base upstream bitrate is defined as 2.5 G, an ONU operating at the nominal upstream bitrate of 5 G has a speedup factor of S=2, whereas an ONU operating at the nominal upstream bitrate of 10 G has a speedup factor of S=4. To maintain backward compatibility, the base bitrate ONUs are considered agnostic to the disclosed methods in the present application.

The clock and data recovery (CDR) module of an OLT receiver should be capable of handling the range of the nominal upstream bitrates from the base upstream rate to the nominal upstream rate associated with the largest speedup factor among the ONUs on the PON.

In order to support ONUs of multiple nominal upstream bitrates within one or more flexible upstream rate ONUs, including the base rate ONUs, the burst profile specification method and the BWmap allocation record format should remain identical to that of the conventional XG-PON1 system. The interpretation of the burst profiles and the BWmap format fields by the ONUs with the speedup factor S>1 may be specified. The duration of the burst preamble and delimiter expressed in the unit of time shall remain invariant with respect to the speedup factor. Therefore, the overall length of the PSBu, in bits, should be S times longer than the specified base rate PSBu length.

Figure 3:
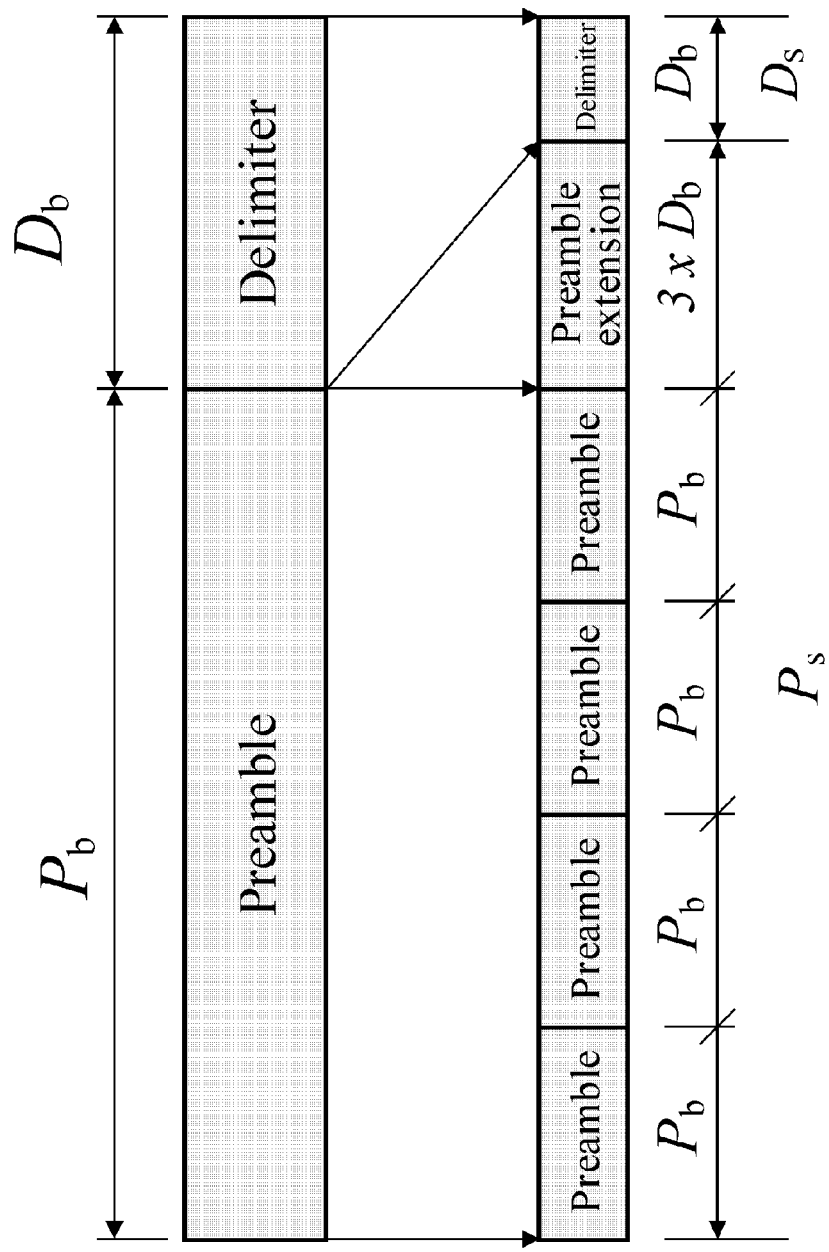
FIG. 3 illustrates one way of constructing a PSBu field for an ONU operating at the four times higher nominal upstream rate, said PSBu invariant duration in terms of time but being four times longer in terms of bits in accordance with some implementations of the present application.

As shown in FIG. 3, assuming that the specified base rate preamble length is $P_b$ bits and the specified base rate delimiter length is $D_b$ bits, an ONU having a speedup factor of S (which is 4 in this example) obtains the rate-specific preamble and delimiter lengths of $P_S$ bits and $D_S$ bits, respectively, as follows:

$$P_S = S \times P_b \pm (S-1) \times D_b$$

$$D_S = D_b$$

In some implementations of the present application, a rate-specific preamble is constructed by repeating a specified base bitrate preamble pattern as many times as required to fill a field of $P_S$ length. In some implementations of the present application, each zero in the specified base bitrate preamble pattern is substituted with a well-known S-bit pattern, and each one in the specified base bitrate preamble pattern is replaced with another well-known S-bit pattern. The rate-specific delimiter is a bit pattern that may remain identical to the specified base bitrate delimiter.

Figure 9:
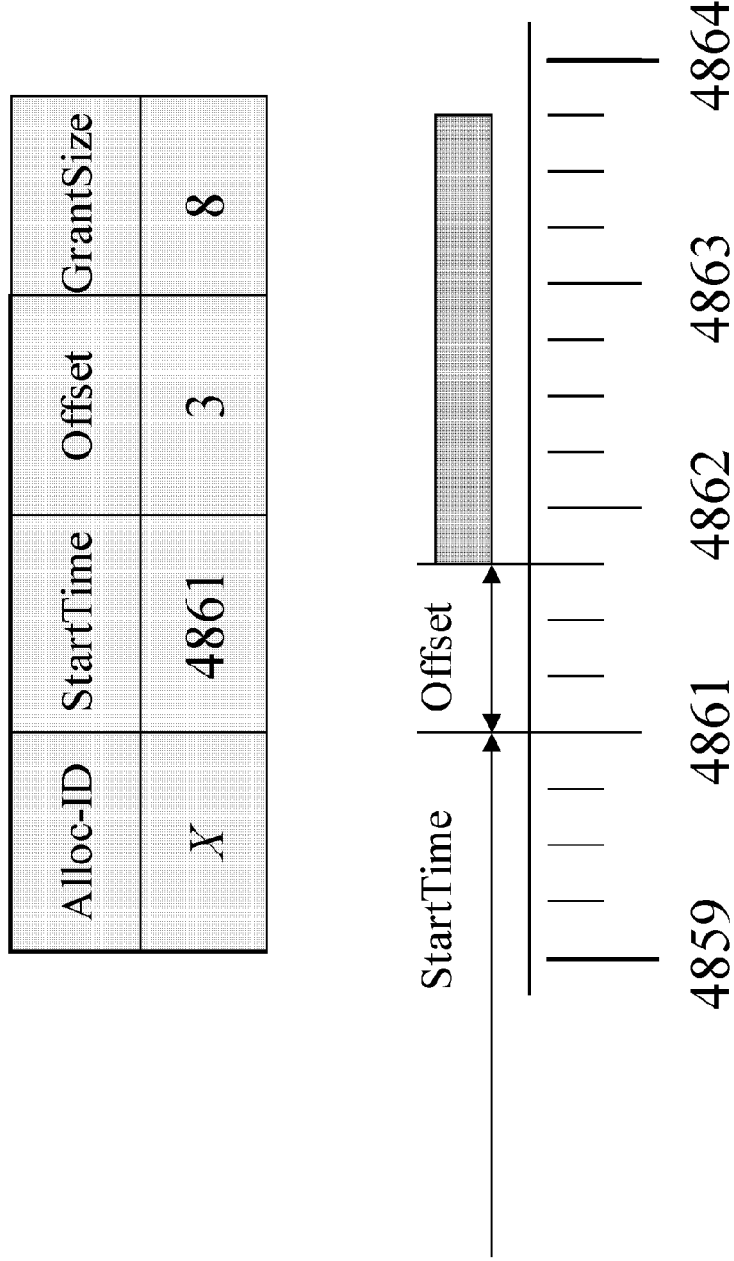
FIG. 9 illustrates how the 4-byte granularity of burst allocation can be maintained under the disclosed invariant bandwidth map format extension in accordance with some implementations of the present application.

Further, in order to support ONUs of multiple nominal upstream bitrates within one or more flexible upstream rate ONUs, the length, range and semantics of the StartTime parameter shall remain the same as the ones in the conventional XG-PON1 system, that is, the StartTime parameter shall have the range of 0 . . . 9719, with its values pointing to 9720 reference points uniformly spread within an upstream PHY frame. Whereas a base-upstream-bitrate ONU can transmit 4 bytes between the two reference points, an ONU having a speedup factor of S can transmit 4×S bytes within the same time interval. The value of the GrantSize parameter retains the length and semantics of that in the conventional XG-PON1 system, that is, the GrantSize parameter specifies the length in 4-byte words of the granted transmission payload size. In some implementations, the range of the GrantSize parameter is extended to allow the values 0, 1, and 4 . . . (9720×S−2). In some other implementations, the range of the GrantSize parameter is set to be identical to that of the conventional XG-PON1 system and it uses the 2 most significant bits of the 16-bit GrantSize field to provide the compensation for the coarser granularity of the StartTime parameter. This 2-bit field may specify the Offset, in 4-byte words, ranging from 0 to 3 so that an ONU having a speedup factor S>1 has to apply to the StartTime parameter of the BWmap allocation record to obtain the effective StartTime parameter of the burst. FIG. 9 illustrates how the 4-byte granularity of burst allocation can be maintained under the disclosed invariant bandwidth map format extension in accordance with some implementations of the present application. If one and the same ONU having the speedup factor S>1 is granted multiple contiguous transmission opportunities, the Offset field may have significance in the first allocation record only and be set to a default value and ignored in the subsequent contiguous allocation records.

While particular embodiments are described above, it will be understood it is not intended to limit the patent document to these particular embodiments. On the contrary, the patent document includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the patent document. First ranking criteria and second ranking criteria are both ranking criteria, but they are not the same ranking criteria.

The terminology used in the description of the patent document herein is for the purpose of describing particular embodiments only and is not intended to be limiting of the patent document. As used in the description of the patent document and the appended claims, the singular forms "a,"

"an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the patent document to the precise forms disclosed. Many modifications and variations are possible in view of the above teachings. The implementations were chosen and described in order to best explain principles of the patent document and its practical applications, to thereby enable others skilled in the art to best utilize the patent document and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A method of accommodating optical network units (ONUs) of different nominal upstream bitrates in a 10-gigabit per second capable passive optical network (PON) system, the method comprising:
   providing a unified burst preamble specification and a unified format bandwidth map allocations in a downstream direction; and
   adjusting burst preambles for the ONUs according to the respective ONU nominal upstream bitrates, wherein the length of an upstream Physical Synchronization Block (PSBu) of an ONU having a nominal upstream bitrate of S times a base upstream bitrate is S time longer than a specified base rate PSBu length.

2. The method of claim 1, wherein the burst preamble of the ONU having the nominal upstream bitrate of S times the base upstream bitrate is formed by repeating a specified unified burst preamble.

3. The method of claim 1, wherein the burst preamble of the ONU having the nominal upstream bitrate of S times the base upstream bitrate is formed by substituting every 0 and every 1 in a specified unified burst preamble with a predefined S-bit zero-pattern and a predefined S-bit one-pattern, respectively.

4. The method of claim 1, wherein a delimiter bit-pattern remains invariant with respect to the nominal upstream bitrate of the ONU.

5. A method of accommodating optical network units (ONUs) having different nominal upstream bitrates in a 10-gigabit per second capable passive optical network (PON) system, the method comprising:
   interpreting bandwidth map allocations for the individual ONUs according to the ONUs' respective nominal upstream bitrates; and
   determining a nominal upstream bitrate for each individual ONU by analyzing its associated burst preambles, wherein the length of an upstream Physical Synchronization Block (PSBu) of an ONU having a nominal upstream bitrate of S times a base upstream bitrate is S times longer than a specified base rate PSBu length.

6. The method of claim 5, wherein a StartTime parameter of a bandwidth map allocation record points to a fixed set of reference instants within an upstream burst, the fixed set being invariant with respect to a nominal upstream bitrate of a target ONU.

7. The method of claim 5, wherein a GrantSize parameter of a bandwidth map allocation record determines a size of an upstream burst in term of fixed size words, said word size being invariant with respect to a nominal upstream bitrate of a target ONU.

8. The method of claim 7, wherein two unused bits of the GrantSize parameter are used as an offset to improve a granularity of an effective StartTime parameter value.

9. An optical network unit (ONU), configured to:
   receive a unified burst preamble specification and a unified format bandwidth map allocations in a downstream direction; and
   adjust a burst preamble of the ONU according to a nominal upstream bitrate of the ONU, wherein the length of an upstream Physical Synchronization Block (PSBu) of an ONU having a nominal upstream bitrate of S times a base upstream bitrate is S times longer than a specified base rate PSBu length.

10. The ONU of claim 9, wherein the burst preamble of the ONU having the nominal upstream bitrate of S times the base upstream bitrate is formed by repeating a specified unified burst preamble.

11. The ONU of claim 9, wherein the burst preamble of the ONU having the nominal upstream bitrate of S times the base upstream bitrate is formed by substituting every 0 and every 1 in a specified unified burst preamble with a predefined S-bit zero-pattern and a predefined S bit one-pattern, respectively.

12. The ONU of claim 9, wherein a delimiter bit-pattern remains invariant with respect to the nominal upstream bitrate of the ONU.

* * * * *